March 15, 1932.  W. C. WRIGHT  1,849,130

FLUSH VALVE

Filed Oct. 5, 1928

Inventor:
Warren C. Wright,
By Eugene Swan
Atty.

Patented Mar. 15, 1932

1,849,130

UNITED STATES PATENT OFFICE

WARREN C. WRIGHT, OF CHICAGO, ILLINOIS

FLUSH VALVE

Application filed October 5, 1928. Serial No. 310,463.

This invention relates to flush valves for toilet fixtures, such as closet bowls, etc.

In my co-pending application Serial No. 304,203, I have shown, described and claimed, a flush valve having a main valve, an auxiliary valve carried by the main valve, a pivoted lever carried by the main vale for opening the auxiliary valve, an actuating mechanism for swinging the lever to open the auxiliary valve, and a gravity acting trigger carried by the lever to receive the thrust of the actuating mechanism when opening the auxiliary valve, said trigger permitting the main valve to close without unseating the auxiliary valve should the actuating mechanism be in the path of the trigger during the closing movement of the main valve.

The use of a trigger requires that it be fulcrumed on the lever and also that the end of the lever at the trigger be spaced inward from the actuating mechanism far enough to permit the trigger to drop into a position between the lever and the actuating mechanism so that the trigger may receive the thrust of the actuating mechanism when starting a flush through the valve. While this arrangement is not objectionable, it is somewhat expensive to make and assemble, especially when manufacturing the valves in large quantities as required for commercial production.

The object of my present invention is to provide an improved form of member on the lever to receive the thrust of the actuating mechanism when opening the auxiliary so that the structure is simpler and less expensive to make and assemble, thereby reducing the manufacturing cost of the entire valve.

In carrying out the object of my present invention, I slidably mount the member on the lever thereby reducing the space required for the member between the lever and actuating mechanism, and thus permit the lever to be arranged closer to the actuating mechanism.

It is a further object of my present invention to make this member in the form of sleeve telescopically arranged on the lever and allowed to drop by gravity into position to receive the thrust of the actuating means, there being a stop provided to prevent the sleeve from dropping off the lever.

A further object of the invention is to reduce the height of the valve fixture and make it cheaper and more compact by arranging the actuating mechanism in the same general horizontal plane with the intake opening of the valve.

The invention consists further in the matters hereinafter described and claimed.

Figure 1:
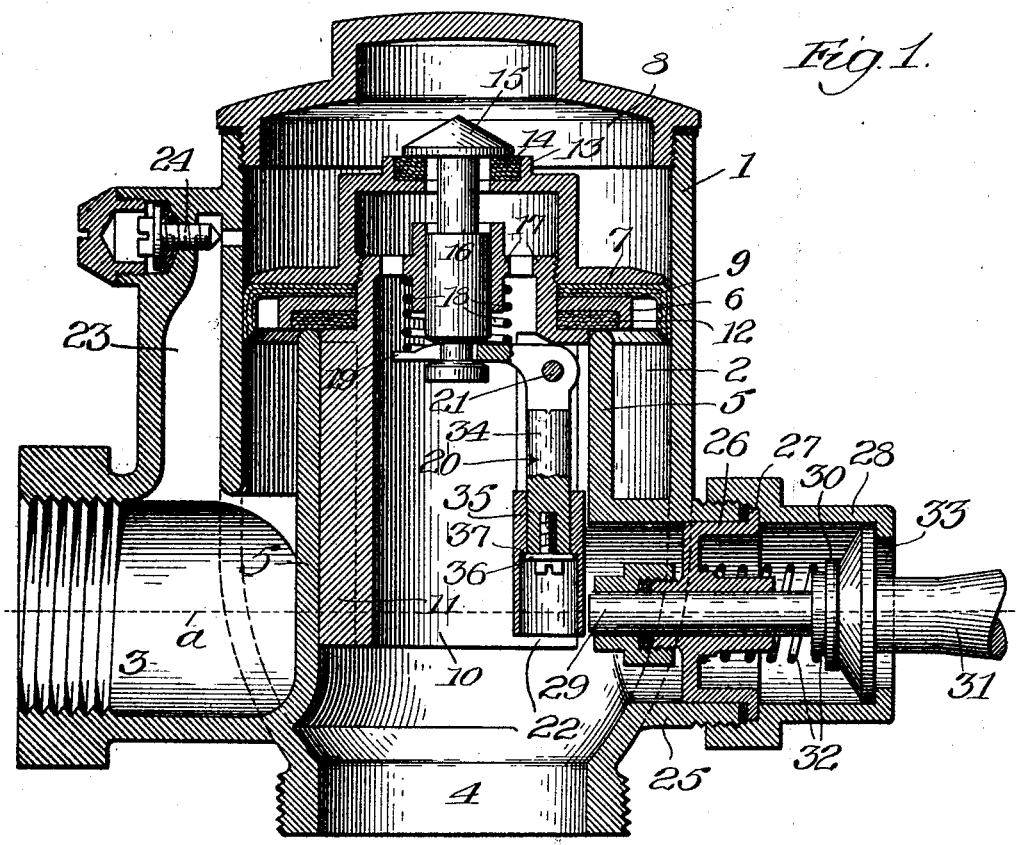
Figure 2:
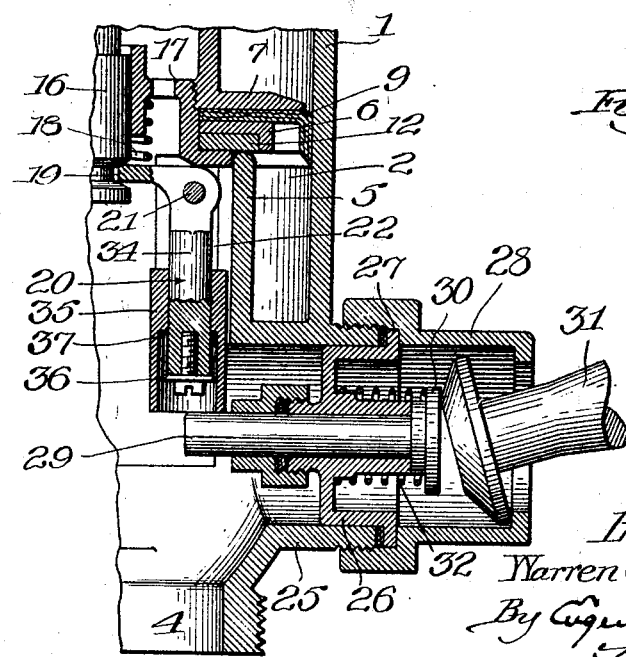

In the accompanying drawings:

Fig. 1 is a vertical sectional view through a valve assembly containing the gravity acting member in accordance with my invention, and Fig. 2 is a similar sectional view showing the action of said member.

The valve device of my invention comprises a main housing 1 of cast brass or other suitable material. The housing 1 is provided with a passage for the flow of liquids therethrough, and such passage includes a chamber 2 within the housing and inlet and outlet openings 3, 4 at the opposite ends of the passage. The inlet opening 3 is in constant communication with the chamber 2.

The chamber 2 is divided from the outlet opening 4 by an upright cylindric wall 5 having its lower end cast integral with the housing 1 and opening into the outlet opening 4. Said wall 5 extends upward through the chamber 2 and has its upper end forming a seat for the main valve 6 which controls the flow of liquids through the housing. The openings 3, 4 may be threaded for attachment to the source of water supply and toilet fixture, respectively.

The main valve 6 forms part of a piston 7, which has a sliding fit in a cylindric chamber 8 provided in the housing 1 above the chamber 2 and forming an upward continuation thereof. The piston 7 has a sealing leather 9 which engages the inner wall of the chamber 8 to seal it from the chamber 2 in all positions of the piston.

The piston 7 has a centrally disposed tubular guide 10 which extends downward into the cylinder 5, said guide having radial webs 11 which engage the inner surface of the cylinder 5 to guide the piston 7 in its up and down movements. A gasket 12 is secured to the under side of the piston 7 about the guide 10 to seat against the upper end of the wall 5 when main valve 6 is closed. The spaces between the webs 11 and the guide 10 provide the discharge passages for the valve when the main valve 6 is open.

A tubular projection 13 extends upward from the piston 7 and is provided at its upper end with a gasket 14 which provides a seat for a relief on auxiliary valve 15. The valve 15 has a stem 16 which extends downward through the projection 13 and into the guide 10 through a spider 17 at the upper end of the guide. The spider 17 holds the valve 15 central and guides it in its vertical opening and closing movements.

A coiled spring 18 is provided about the stem 16 to normally hold said valve closed. The spring 18 bears at its upper end against the spider 17 and at it lower end against the upper arm 19 of a bell-crank lever 20. Said lever 20 is fulcrumed at 21 on the guide 10 in the upper end of a vertical slot 22 in one side of the guide.

A by-pass 23 is cored in the housing 1 on the intake side of the valve and opens at its lower end into the intake connection 3 and at its upper end into the chamber 8 above the piston 7. A timing pin 24 controls the flow of liquids into chamber 8 from the intake 3.

The upper surface of the piston 7 as exposed to the water pressure in chamber 8 is greater in area than the under surface of the piston which is exposed to the water pressure in the chamber 2 when the valve 6 is closed. The result is, although the pressure on opposite sides of the piston will be the same as on the intake side of the valve, the valve 6 will be held closed against its seat by reason of the greater area exposed to the pressure in chamber 8.

For opening the auxiliary valve 15 to relieve the pressure in the chamber 8 so that the main valve 6 may be opened by the pressure on its under side, the following actuating mechanism is provided.

A tubular boss 25 is cast integral with the housing 1 directly opposite the intake connection 3 and in substantial axial alignment therewith as indicated by the center line $a$ in Fig. 1. Fitted in the boss 25 is a guide member 26 which has its peripheral flange 27 clamped against the outer end of the boss by a hollow nut 28.

Slidably mounted in the guide 26 is a plunger 29 having its head 30 in the nut 28 and held against the head of the handle 31 by a coiled spring 32. The head of the handle 31 is mounted in the nut 28 and by reason of the enlarged opening 33 in the nut, the handle may be oscillated in any direction to move the plunger 29 inward.

Mounted on the lower arm 34 of the lever 20 is a gravity acting member in the form of a sleeve 35 having a sliding fit on said arm. The latter terminates short of the plunger 29 so that the sleeve 35 may extend below the arm 34 to be in the path of inward movement of the plunger and receive the thrust thereof when swinging the lever 20 to open the auxiliary valve 15. The arm 34 carries a stop 36 to engage a shoulder 37 on the sleeve 35 to prevent the sleeve from dropping off the end of the arm.

As shown in the drawings, the stop 35 is in the form of a screw threaded into the lower end of the arm and having its head slightly larger than the arm so as to project beyond the sides of the same. The bore of the sleeve 35 is enlarged at the lower end of the sleeve to fit about the head of the screw and provide the shoulder 37.

To open the auxiliary valve 15 to start the flushing operation, the plunger 29 is moved inward by oscillating the handle 31. This thrusts the inner end of the plunger against the sleeve 35 and swings the lower arm of the lever 20 inward. This swings the upper arm 19 of the lever upward, and the auxiliary valve 15 is unseated. This relieves the pressure in the chamber 8 through the main valve 6 and the piston 7 moves upward carrying the lever 20 therewith. This carries the sleeve 35 above and out of contact with the plunger 29, and the auxiliary valve 15 closes by the action of the spring 18. The sleeve 35 is so proportioned that it remains in abutting contact with the inner end of the plunger for substantially the full opening movement of the main valve 6, thereby insuring a full opening of the main valve before the sleeve is released from the plunger to allow the auxiliary valve to close. Pressure builds up in the chamber 8 through the by-pass 23 as soon as the relief valve 15 closes and the main valve 6 closes to cut off the flow from 3 to 4.

Should the handle 31 be held in valve opening position during the descent of the main valve 6, the plunger 29 will be in the path of downward movement of the sleeve 35. The latter, however, on contact with the plunger 29 will slide upward on the lever arm 34 and prevent unseating of the auxiliary valve 15, as shown in Fig. 2. When the handle 31 is released the plunger 29 will be retracted by spring 32, freeing the sleeve 35 and allowing it to drop by gravity into position in line with the inner end of the plunger 29 for again opening the auxiliary valve when another flush is desired.

With the lever 20 swinging in the slot 22 and with the plunger 29 working through said slot, the actuating mechanism for the auxiliary valve 15 may be brought close to the main valve 6. This permits the boss 25 which provides a support for the actuating mechanism to be located in the same general horizontal plane with the inlet connection 3, whether the boss is in axial alignment with the inlet connection 3 or not.

With the parts so located, the height of the valve assembly is considerably reduced, thereby providing a more compact and lighter valve structure. Moreover with the height of the valve reduced, the cost of manufacture is reduced, because less metal is required in the housing and less work is required in the casing and machining. Thus with by invention cheaper and neater appearing valves can be made. The gravity acting member 35 provides a simple and inexpensive construction and one which acts positively at all times without the use of springs or other parts which are likely to fail or break in use.

The details of structure and arrangement of parts shown and described may be variously changed and modified without departing from the spirit and scope of my invention.

I claim as my invention:

1. In a flush valve, an upright housing having intake and discharge openings, the intake opening being arranged at one side of the housing, a main valve in the housing for controlling the flow of liquids therethrough, an auxiliary valve carried by the main valve for controlling the operation thereof, a pivoted lever carried by the main valve for opening the auxiliary valve, and actuating means for swinging the lever to open the auxiliary valve, said actuating means being mounted on the housing with its longitudinal axis in the same horizontal plane with the similar axis of the intake opening.

2. In a flush valve an upright housing having intake and discharge openings, the intake opening being arranged at one side of the housing, a main valve in the housing for controlling the flow of liquids therethrough, an auxiliary valve carried by the main valve for controlling the operation thereof, a pivoted lever carried by the main valve for opening the auxiliary valve, and actuating means for swinging the lever to open the auxiliary valve, said actuating means being mounted on the housing with its longitudinal axis in substantial alignment with longitudinal axis of the intake opening.

3. In a flush valve, an upright housing having intake and discharge openings, the intake opening being at one side of the housing, a main valve in said housing for controlling the flow of liquids therethrough, an auxiliary valve carried by the main valve for controlling the operation thereof, and actuating means for opening the auxiliary valve, said housing having a tubular boss at one side thereof and in the same horizontal plane with the longitudinal axis of the intake opening to support the actuating means.

4. In a flush valve, a housing having intake and discharge openings, a main valve in the housing for controlling the flow of liquids therethrough, an auxiliary valve carried by the main valve for controlling the operation therof, a cylinder dividing the intake opening from the discharge opening and forming a seat for the main valve, a tubular guide carried by the main valve and having a sliding fit in said cylinder, and actuating means for opening the auxiliary valve, said guide having a slot in one side thereof so that the actuating means may operate through the slot and be mounted on the housing in the same general horizontal plane of the longitudinal axis of the intake opening.

5. In a flush valve, a housing having intake and discharge openings, a main valve in the housing for controlling the flow of liquids therethrough, an auxiliary valve carried by the main valve for controlling the operation thereof, a pivoted lever carried by the main valve for opening the auxiliary valve, a cylinder dividing the intake opening from the discharge opening and forming a seat for the main valve, a tubular guide carried by the main valve and having a sliding fit in said cylinder, and actuating means mounted on the housing for swinging the lever to open the auxiliary valve, said guide having a slot on one side thereof so that the actuating means may operate therethrough, said slot permitting the actuating means to be mounted on the housing in the same general horizontal plane of the longitudinal axis of the intake opening.

In testimony whereof I affix my signature.

WARREN C. WRIGHT.